(12) United States Patent
Kilgore (10) Patent No.: US 10,602,803 B2
(45) Date of Patent: Mar. 31, 2020

(54) SOCKLINER FOR A SHOE

(71) Applicant: NIKE, INC., Beaverton, OR (US)

(72) Inventor: Bruce J. Kilgore, Beaverton, OR (US)

(73) Assignee: NIKE, Inc., Beaverton, OR (US)

(*) Notice: Subject to any disclaimer, the term of this patent is extended or adjusted under 35 U.S.C. 154(b) by 0 days.

(21) Appl. No.: 15/439,623

(22) Filed: Feb. 22, 2017

(65) Prior Publication Data

US 2017/0245592 A1    Aug. 31, 2017

Related U.S. Application Data

(60) Provisional application No. 62/300,762, filed on Feb. 26, 2016.

(51) Int. Cl.

| | | |
|---|---|---|
| A43B 17/18 | (2006.01) | |
| A43B 17/14 | (2006.01) | |
| A43B 17/02 | (2006.01) | |
| A43B 13/14 | (2006.01) | |
| A43B 7/14 | (2006.01) | |
| B29D 35/14 | (2010.01) | |
| A43B 17/00 | (2006.01) | |

(52) U.S. Cl.
CPC .............. *A43B 17/18* (2013.01); *A43B 7/141* (2013.01); *A43B 7/142* (2013.01); *A43B 7/143* (2013.01); *A43B 13/141* (2013.01); *A43B 17/006* (2013.01); *A43B 17/02* (2013.01); *A43B 17/14* (2013.01); *B29D 35/142* (2013.01); *B29D 35/148* (2013.01)

(58) Field of Classification Search
CPC ......... A43B 17/14; A43B 17/18; A43B 7/141; A43B 7/142; A43B 7/143; A43B 13/141; A43B 17/006; A43B 17/02; B29D 35/142; B29D 35/148
USPC ............................................................. 36/44
See application file for complete search history.

(56) References Cited

U.S. PATENT DOCUMENTS

| | | | |
|---|---|---|---|
| 2,153,832 A | 4/1939 | Gutwein | |
| 2,336,155 A | 12/1943 | Ayers | |
| 2,715,285 A | 8/1955 | Del Vecchio | |
| 2,807,102 A * | 9/1957 | Sheppard | A43B 7/141 |
| | | | 36/178 |

(Continued)

FOREIGN PATENT DOCUMENTS

| | | |
|---|---|---|
| DE | 3314525 A1 | 10/1984 |
| DE | 102010008627 A1 | 8/2011 |

(Continued)

OTHER PUBLICATIONS

English machine translation of JP 4913263 (Shinohara, et al.) via espacenet.com. Translation performed on Nov. 23, 2018.*

(Continued)

*Primary Examiner* — Clinton T Ostrup
*Assistant Examiner* — Jocelyn Bravo
(74) *Attorney, Agent, or Firm* — Shook, Hardy & Bacon L.L.P.

(57) ABSTRACT

A sockliner for a shoe or other article of footwear is formed having at least one generally flat, planar surface. At least a portion of the sockliner has a linear width that exceeds the linear distance across a width of the shoe. When the sockliner is placed in the shoe, pressure on the wider portions of the sockliner changes the conformation of the sockliner to conform to the shoe.

14 Claims, 7 Drawing Sheets

(56) References Cited

U.S. PATENT DOCUMENTS

| | | | |
|---|---|---|---|
| 2,884,718 A | 5/1959 | Kearns | |
| 2,917,850 A | 12/1959 | Scholl | |
| 2,979,835 A | 4/1961 | Scholl | |
| 3,126,650 A | 3/1964 | Goldstein | |
| 3,344,537 A | 10/1967 | Diamant | |
| 3,629,961 A | 12/1971 | Seif | |
| 3,828,792 A * | 8/1974 | Valenta | A43B 7/14 36/178 |
| 4,133,118 A | 1/1979 | Khalsa et al. | |
| 4,353,173 A | 10/1982 | Paquet | |
| 4,435,910 A | 3/1984 | Marc | |
| 4,603,493 A | 8/1986 | Eston | |
| 4,669,142 A * | 6/1987 | Meyer | A43B 7/28 12/142 N |
| 4,700,403 A | 10/1987 | Vacanti | |
| 5,282,326 A * | 2/1994 | Schroer, Jr. | A43B 17/023 36/145 |
| 5,426,869 A | 6/1995 | Gore et al. | |
| 5,850,703 A | 12/1998 | Pearce et al. | |
| 6,481,120 B1 * | 11/2002 | Xia | A43B 13/12 36/140 |
| 8,839,530 B2 | 9/2014 | Smith et al. | |
| 2004/0025376 A1 * | 2/2004 | Grisoni | A43B 7/141 36/44 |
| 2004/0045196 A1 * | 3/2004 | Shepherd | A43B 5/00 36/114 |
| 2004/0163280 A1 * | 8/2004 | Morris | A43B 7/06 36/28 |
| 2005/0044751 A1 * | 3/2005 | Alaimo | A43B 1/0045 36/181 |
| 2005/0108899 A1 * | 5/2005 | Kielt | A43B 3/0063 36/71 |
| 2010/0071229 A1 | 3/2010 | Kuo | |
| 2011/0277348 A1 * | 11/2011 | Fox | A43B 7/142 36/43 |
| 2012/0198720 A1 | 8/2012 | Farris et al. | |
| 2017/0112231 A1 * | 4/2017 | Torrance | A43B 7/1465 |

FOREIGN PATENT DOCUMENTS

| | | |
|---|---|---|
| DE | 102012216466 A1 | 3/2014 |
| FR | 2973657 A1 | 10/2012 |
| JP | 4913263 B2 | 4/2012 |
| WO | 9502974 A1 | 2/1995 |
| WO | 2010134187 A1 | 11/2010 |

OTHER PUBLICATIONS

International Search Report and Written Opinion dated Jun. 14, 2017 in International Patent Application No. PCT/US2017/019709, 17 pages.

International Search Report and Written Opinion dated Jun. 14, 2017 in International Patent Application No. PCT/US2017/019711, 16 pages.

International Preliminary Report on Patentability dated Mar. 30, 2018 in International Patent Application No. PCT/US2017/019709, 13 pages.

Non-Final Office Action dated Sep. 14, 2018 in U.S. Appl. No. 15/439,628, 8 pages.

Notice of Allowance dated Jan. 9, 2019 in U.S. Appl. No. 15/439,628, 5 pages.

* cited by examiner

SOCKLINER FOR A SHOE

CROSS-REFERENCE TO RELATED APPLICATIONS

This application claims the benefit of U.S. Provisional Patent Application No. 62/300,762, filed Feb. 26, 2016, which is hereby incorporated by reference in its entirety. This application is related by subject matter to U.S. Provisional Patent Application No. 62/300,760, filed Feb. 26, 2016.

TECHNICAL FIELD

This disclosure relates to sockliners of the kind that may be placed inside a shoe, as an insole or on top of the insole.

BACKGROUND

A sockliner is a piece of a material, usually thin, within a shoe or other article of footwear that contacts at least the bottom (plantar) portion of the foot when the shoe is worn. The sockliner may be removable, as for wearer preference or for washing the sockliner and/or the shoe, or may be unitary to the shoe. A sockliner may provide cushioning, warmth, improved fit, or other benefits. Ideally, the sockliner fits tightly inside the shoe. If the sockliner is too large, it may wrinkle or pucker. If the sockliner is too small, it may move within the shoe during donning or wear. In either case, an ill-fitting sockliner may be uncomfortable and/or unsightly. If the sockliner is sized to fit precisely into the shoe, the function and appearance of the sockliner improves, but the sockliner may be difficult to position into the shoe during manufacture.

BRIEF SUMMARY

This brief summary is provided as a general overview of the more detailed disclosure which follows. It is not intended to identify key or essential elements of the disclosure, or to define the claim terms in isolation from the remainder of the disclosure, including the drawings.

This disclosure generally relates to a sockliner which, by virtue of its structure, materials, and/or method of manufacture, individually or in combination, may be relatively easy to place into a shoe during manufacture without sacrificing fit.

In some aspects, this disclosure relates to a sockliner having a first, flat surface, and a second, contoured surface. The second surface may have a smaller perimeter than the first surface. Third and fourth surfaces may join the sides of the first and second surfaces, bridging the perimeters of the first and second surfaces. The third and fourth surfaces may themselves be contoured, making the sockliner thinner in the area between the first and second perimeters than within the second perimeter.

A shoe comprising a sockliner in accordance with aspects of this disclosure may comprise an upper, a sole, and a sockliner. The sockliner may comprise a first surface comprising a transversely-oriented arc, a second contoured surface opposing the first surface, and third and fourth surfaces connecting facing edges of the first and second surfaces. The sockliner may be thinner in a variable width border along the perimeter of the sockliner than at the center of the sockliner. The transversely-oriented arc in the first surface is formed by lifting the third and fourth surfaces away from the second surface.

In some aspects, the disclosure relates to a sockliner having a compressible foam body. The sockliner may have one or more wings integral to and extending laterally from the foam body. The wings may differ from the body in thickness, composition, or both from the foam body. The foam body is contoured such that when the wings are lifted away from the foam body, the foam body forms a laterally-oriented arc.

Additional objects, advantages, and novel features of various aspects of the sockliner will be set forth in part in the description which follows, and in part will become apparent to those skilled in the art upon examination of the following, or may be learned by practice of the disclosure.

BRIEF DESCRIPTION OF THE SEVERAL VIEWS OF THE DRAWING

The present disclosure references the attached drawing figures, wherein.

DETAILED DESCRIPTION

As used herein, "sockliner" refers to a layer of material inside a shoe, on top of an insole or possibly in lieu of an insole, which may be unitary to and irremovable from the shoe or removable from the shoe. As used herein, "sockliner" does not refer to a stocking or other thin garment which may be worn against the foot and under a sock, the sock being worn over both the foot and the stocking.

As used herein, "shoe" may include a broad range of footwear, including, without limitation, boots (including, without limitation, dress boots, snow boots, ski boots, equestrian boots, work boots, and the like), flats, pumps, wedges, athletic shoes (including, without limitation, soccer shoes, baseball shoes, basketball shoes, golf shoes, running shoes, walking shoes, and the like), studio shoes (including, without limitation, dance shoes, and studio wraps), slippers, and casual or fashion shoes. The sockliner described herein could be adapted for variations of any of these kinds of shoe, as well as some styles of sandals.

Figure 1:
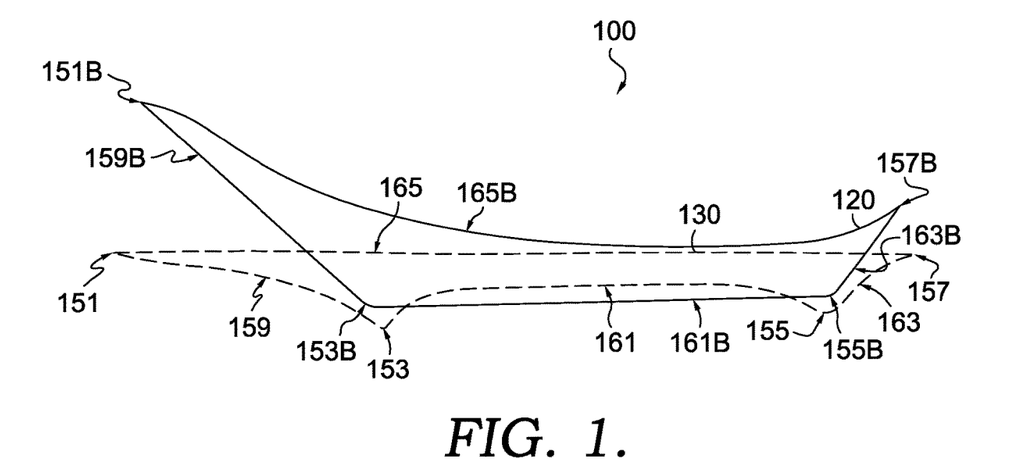
FIG. 1 is a sectional side view of an exemplary sockliner in accordance with aspects of this disclosure.

FIG. 1 shows an exemplary sockliner 100 according to aspects of this disclosure. The view is a sectional side view, with the solid lines indicating the shape of the sockliner 100 when it has conformed to the interior of a shoe (an "in-use conformation" 120), and the dashed lines indicating the shape of the sockliner 100 in a relaxed conformation 130. The relaxed conformation 130 may reflect the shape in which the sockliner 100 is manufactured, as described below. When placed inside a shoe, the sockliner 100 may take on an in-use conformation 120. The relaxed conformation 130 and the in-use conformation 120 are different conformations that may be assumed under different conditions by the same sockliner 100.

As shown, in the relaxed conformation 130, sockliner 100 has a medial side 159, which runs between an upper medial edge 151 and a lower medial edge 153. The medial side 159 corresponds to the medial side of a right foot (e.g., a human foot). A sockliner for a left foot could be substantially a mirror image of the sockliner 100. In the relaxed conformation 130, medial side 159, as shown, has a generally concave curvature relative to a center of the sockliner 100. When pressed or placed into a shoe or shoe sole, as described in greater detail below, the sockliner 100 may assume in-use conformation 120, having medial side 159B which runs between an upper medial edge 151B and a lower medial edge 153B. In the in-use conformation 120, medial side 159B, as shown, is generally flat, and might even be slightly convex. Similarly, in the relaxed conformation 130, sockliner 100 has a lateral side 163 which runs between an upper lateral edge 157 and a lower lateral edge 155. In the relaxed conformation 130, lateral side 163 may have a surface which is generally concave relative to a center of sockliner 100. In the in-use conformation 120, the lateral side 163B may be generally flat or even slightly convex, and may run between upper lateral edge 157B and lower lateral edge 155B.

Sockliner 100 further has a bottom-facing side or bottom surface 161, which, in the relaxed conformation 130 runs between lower medial edge 153 and lower lateral edge 155, and may be generally concave relative to a center of sockliner 100. In the in-use conformation 120, bottom surface 161B runs between lower medial edge 153B and lower lateral edge 155B, and may be generally flat or even slightly convex. Sockliner 100 has a top-facing (e.g., foot-facing) side or top surface 165, which, in the relaxed conformation 130 runs between upper medial edge 151 and upper lateral edge 157, and may be generally flat. In the in-use conformation 120, top-facing side or top surface 165B runs between upper medial edge 151B and upper lateral edge 157B, and may be generally concave relative to a center of sockliner 100.

Figure 2:
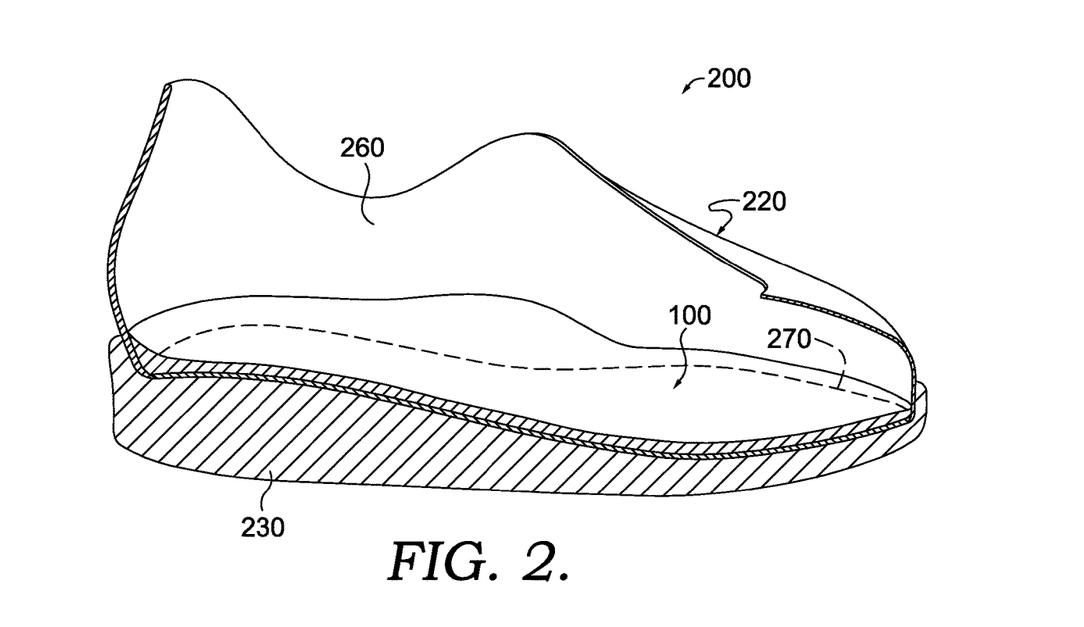
FIG. 2 is a schematic view of a cross-section of an exemplary shoe.

As shown in FIG. 2, an exemplary shoe 200 may have an upper 220 and a sole 230. Upper 220 may include a number of subunits, such as a tongue, a closure, padding or cushioning, and the like. Many variations of uppers, in structure and material, are known in the art and could be used with the sockliner described herein. Sole 230 may comprise two or more layers, such as an outsole, midsole, and/or insole (if an insole separate from sockliner 100 is present). An outsole typically includes the ground-contacting surface of shoe 200 when the shoe is worn. The outsole may provide traction, water-resistance or water-proofing, wear-and/or puncture-resistance, stability, and/or other protection for the foot or ankle. A midsole, which might or might not be visible in the finished shoe, generally provides cushioning. Some midsole structures may use combinations of materials, possibly including stiffening materials, to provide variable support and cushioning over the width and/or length of the shoe. A midsole may also contribute to the stability of the foot within the shoe.

An insole, which might or might not be visible in the finished shoe, or might be visible only when viewing interior 260 of shoe 200, may provide additional cushioning, arch support, or other support and/or comfort. A sockliner 100 may be used with an insole, or may be used in lieu of an insole. Sockliner 100 may provide additional warmth, cushioning (e.g., impact attenuation), moisture management, microbial control, and/or arch support. In some embodiments, sockliner 100 may be used as a post-production and/or customizable insert. Post-production inserts are placed by a user into a shoe which may already have an insole. In this sense, sockliner 100 may be added to a shoe, e.g., by a user or wearer, even if the shoe has a built-in insole/sockliner.

Sole 230, or one or more of the layers of sole 230, may be joined to upper 220 using seam 270. Seam 270 may be any suitable joint, including joints formed via adhesives, cohesives, welding (heat, ultrasound, UV, etc.), sewing, other mechanical attachments, or combinations thereof. Seam 270 may be a strobel-type joint, a series of layers of material from or attached to upper 220 and one or more layers of sole 230 which are stitched together to hold sole 230 to upper 220. Seam 270 is shown in FIG. 2 as a strobel-type joint. Seam 270 may be positioned inside shoe 200, and may be covered by sockliner 100 so that the seam 270 is not visible and/or any texture from the seam does not irritate or press against the foot when shoe 200 is worn. Alternately, seam 270 may be visible and/or perceptible by touch inside shoe 200. In some aspects, sockliner 100 may be cemented into shoe 200. In some aspects, sockliner 100 may be purposefully excluded from seam 270, i.e., not joined into seam 270, so that sockliner 100 can be removed from shoe 10. The ability to remove sockliner 100 may make it easier to clean and/or dry the sockliner if it becomes soiled or wet and may facilitate the use of specialty insoles or orthotics, if desired.

Figure 3:
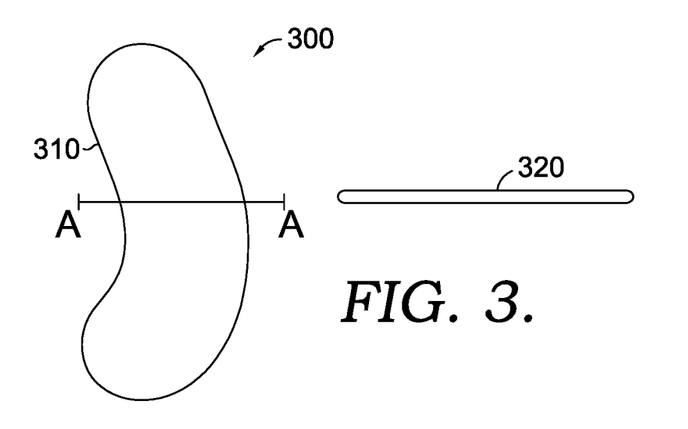
FIG. 3 is a schematic illustration of a conventional, flat sockliner.

FIG. 3 provides a schematic illustration of a conventional, flat sockliner 300. When looking down on the top (foot-facing) surface of the conventional, flat sockliner 300, it has a perimeter 310 which generally follows the interior contours of a partially or fully assembled shoe or the general shape of a foot. When looking at a cross-section 320 along axis A-A, conventional, flat sockliner 300 has a relatively uniform thickness across the width of the sockliner. Conventional, flat sockliner 300 may also be uniform in thickness along a toe-to-heel length of the sockliner.

Figure 4:
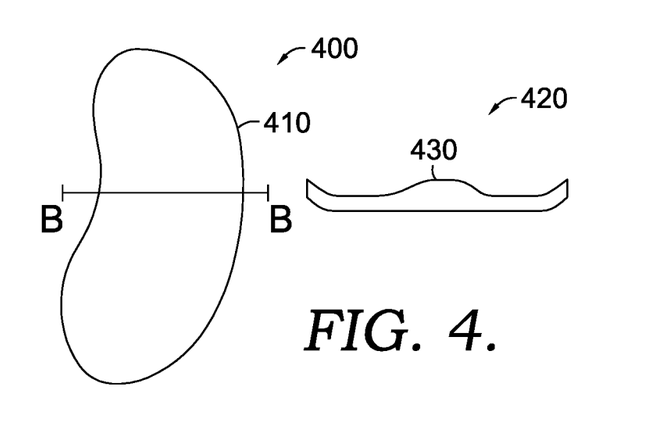
FIG. 4 is a schematic illustration of a conventional, molded sockliner.

FIG. 4 is a schematic illustration of an alternative conventional sockliner 400 having a non-uniform thickness. Alternative conventional sockliner 400 has a perimeter 410 which may closely approximate that of conventional, flat sockliner 300, because both are intended to fit closely to the interior contours of a shoe. However, when a cross-section 420 of alternative conventional sockliner 400 is viewed along axis B-B, it can be seen that alternative conventional sockliner 400 has a varying thickness across the width of the sockliner. The thickness of alternative conventional sockliner 400 may also vary along a toe-to-heel length of the sockliner. Alternative conventional sockliner 400 is typically formed by injection or closed cast molding processes, and is molded to have the shape that is desired when alternative conventional sockliner 400 is placed in the shoe. That is, if alternative conventional sockliner 400 has an arch support feature 430 characterized by a greater thickness in the generally central portion of the width and/or length of the alternative conventional sockliner 400 than along perimeter 410, then alternative conventional sockliner 400 would have a raised arch support feature 430 when molded, and would have a raised arch support feature 430 if removed from the shoe. The conformation of sockliner 400 does not change, or does not change significantly, whether it is in a shoe or in a relaxed state.

Figure 5A:
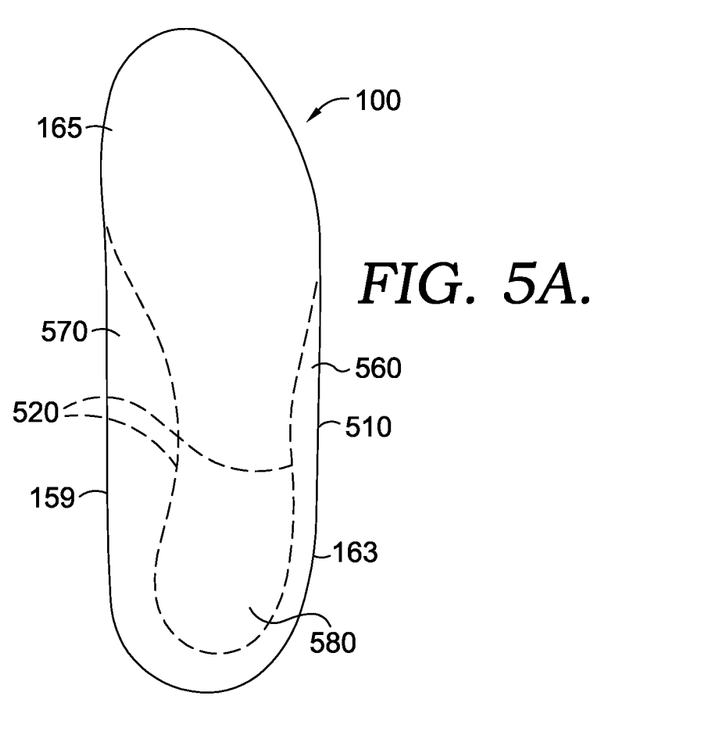
FIG. 5A is a top view of an exemplary sockliner in accordance with aspects of this disclosure.
Figure 5B:
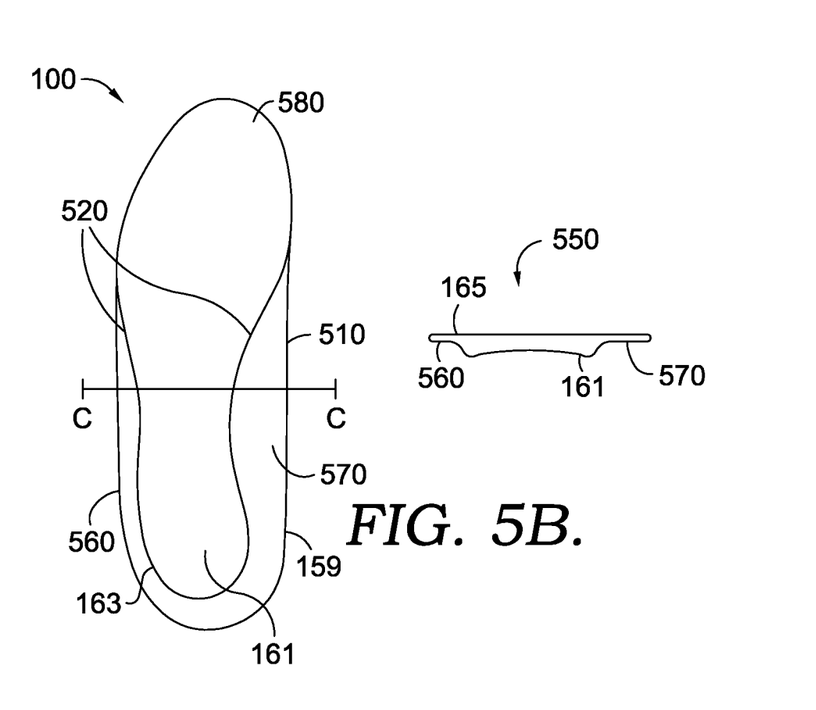
FIG. 5B is a bottom view of an exemplary sockliner in accordance with aspects of this disclosure.

FIGS. 5A and 5B show an exemplary sockliner 100 in accordance with aspects of this disclosure, from the top and bottom, respectively. When sockliner 100 is placed in a shoe as intended, a first surface, top surface 165 is the foot-facing surface of sockliner 100, and a second, contoured surface opposing the first surface, bottom surface 161 faces sole 230. Sockliners 300, 400, and 100 are designed for the same shoe. However, unlike conventional sockliners 300 and 400, sockliner 100 has a perimeter 510 for the top surface 165 which deviates from the general shape of the interior of a shoe, shown in dotted lines as second perimeter 520. Perimeter 520 may correspond to the perimeter of the bottom surface 161. The deviation between perimeter 510 and perimeter 520 may be relatively small, and the width of sockliner 400 measured along a curve (e.g., the arc length across a contoured portion of the surface) may be approximately equal to the width of sockliner 100 at the corresponding position of the sockliner, but the width of sockliner 100 will appear to be wider because the distance is linear across the flat top surface 165 of sockliner 100.

Perimeter 510 and perimeter 520 may be bridged by third and fourth, side surfaces of sockliner 100. The side surfaces may be distinct, with discernable starts and ends along the perimeter, or the side surfaces may meet, e.g., at toe and heel portions, with or without a discernable distinction. However, the sockliner 100 has two sides, a medial side 159 corresponding to the inside or instep of the foot, and a lateral side 163 to the outside of the foot, and each side has a side surface bridging an edge of the top surface 165 of sockliner 100 and an edge of the bottom surface 161 of sockliner 100. The third and fourth side surfaces, shown as lateral side 163 and medial side 159 may be linear, or approximately linear, or contoured. If contoured, at least a portion of the sockliner 100 between the wider perimeter 510 of top surface 165 and the narrower perimeter 520 of bottom surface 161 may be thinner than an average thickness of the sockliner 100 within perimeter 520. The contour of bottom surface 161 and/or one or both side surfaces may include steps, arcs, curves, or other non-linear shapes. As used herein, "contour" does not include a linear-shaped (e.g., flat, planar) surface. A contour may be oriented transversely or laterally, e.g., parallel to an axis running between the medial and lateral sides of the sockliner, or a contour may be oriented lengthwise, e.g., parallel to an axis running between the toe and the heel of the sockliner, or a contour may be oriented diagonally.

As molded, and when in a relaxed state, top surface 165 of sockliner 100 may be flat. That is, top surface 165 of sockliner 100 may be substantially planar (e.g., planar within process, material, and measurement variations customary in the industry). Sockliner 100 is in a relaxed state when it is placed on a table or other supportive surface under normal room conditions (e.g., approximately 1 atm, 20-24° C., relative humidity 35-45%) with no constraints placed on the conformation of the sockliner. If sockliner 100 is turned over to view bottom surface 161 from above, as shown in FIG. 5B, it can be seen that bottom surface 161 is not planar. Rather, a cross-section of sockliner 100 along axis C-C shows that bottom surface 161 has two or more different thicknesses across the width of sockliner 100, when sockliner 100 is in a relaxed state.

Figure 6A:
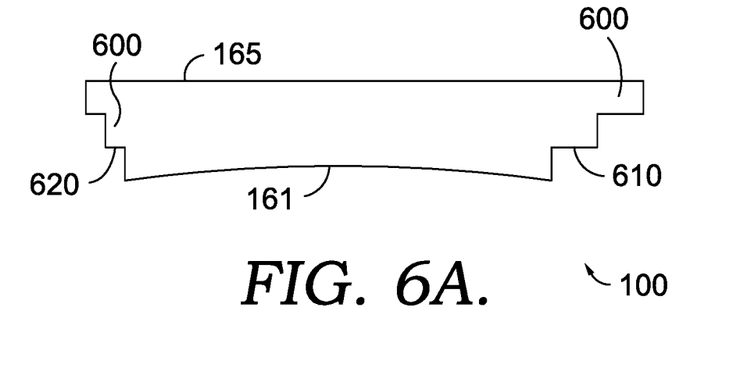
FIG. 6A is a schematic view of a cross-section of an exemplary sockliner in accordance with aspects of this disclosure.
Figure 6B:
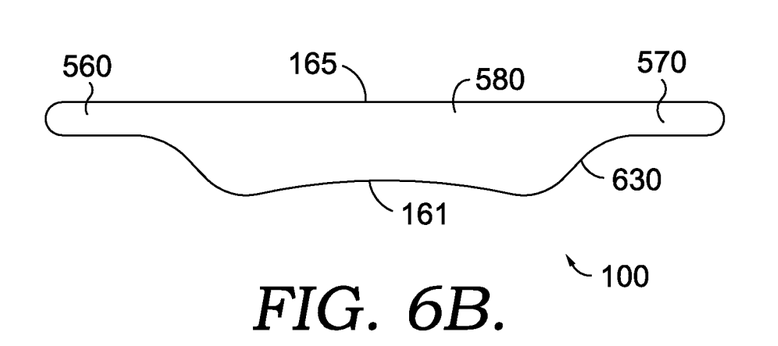
FIG. 6B is a schematic view of a cross-section of an exemplary sockliner in accordance with aspects of this disclosure.

The change in thickness across sockliner 100 may occur step-wise, in one or two or more steps 600, with or without filleting or rounding of the step edges. FIG. 6A shows steps 610, 620 without filleting or rounding. Different shapes or numbers of steps may be used in different portions of sockliner 100, and adjacent steps may have different shapes, lengths, and/or depths. For example, as shown in FIG. 6A, steps 620 have a lesser width than steps 610. The change in thickness across sockliner 100 may follow a curve, with one exemplary curved transition shown in FIG. 6B. The curve 630 may have a uniform arc or variable arc at different portions of the curve, in some aspects potentially resembling a soft S-curve. The arc may vary along the perimeter of the sockliner 100. The change in thickness may be generally arcuate. The curve 630 may be concave relative to top surface 165 of sockliner 100.

The portions of sockliner 100 between perimeter 510 and perimeter 520 may form laterally extending wings 560, 570 which, because of the different thickness and/or material composition, may be noticeably distinct in appearance, flexibility, etc. from the body 580 of sockliner 100. In some cases, the wings may be noticeably different only in comparison to a shoe template or general shoe shape. The body 580 of sockliner 100 may have perimeter 520, generally corresponding to the shape of the interior foot bed of a shoe. Wings 560, 570 may extend as a border around at least a portion of the perimeter 520 of body 580. Wings 560, 570 may be localized to a central portion of sockliner 100, excluding the toe and heel of sockliner 100. Wings 560, 570 could extend longitudinally, or both longitudinally and laterally, from body 580. One or more integral wings 560, 570 may be formed as a unit with body 580.

Figure 7:
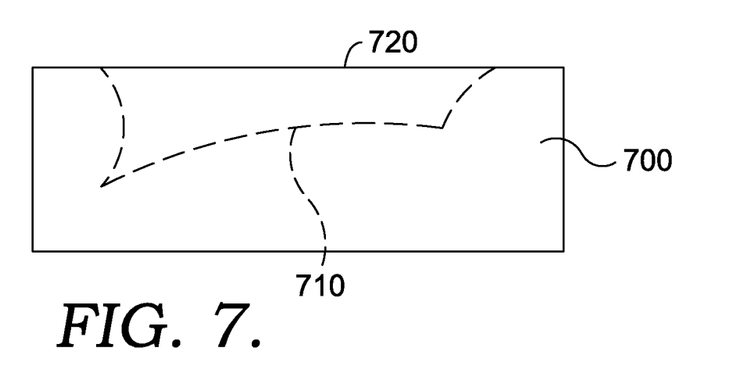
FIG. 7 is a side view of an exemplary mold in accordance with aspects of this disclosure.

Because top surface 165 of sockliner 100 is substantially planar, it can be formed using open molding tools, such as exemplary mold 700, shown from the side in FIG. 7. Exemplary mold 700 provides the form 710 of bottom surface 161 of sockliner 100 in an internal cavity. The mold top 720 may be open and may be substantially flat or planar. The foam may be introduced into the mold in a flowable or at least malleable state, and may be dried or cured to form a solid, compressible foam sockliner. Mold form 710 may be filled with sockliner material, and a straight-edged tool may be used to smooth the material across mold top 720, so that the top surface of sockliner material inside mold 700 is smooth and flush with mold top 720. The smooth material, flush with planar top 720 of mold 700, yields a substantially flat top surface 165 for sockliner 100. A portion of mold form 710 corresponding to body 580 of sockliner 100 may extend a full depth of the mold, from the flat upper surface of the mold to a bottom of the forming surface at its farthest point (measured orthogonally) from the top 720 of mold 700. One or more wing portions of mold form 710 corresponding to one or more wings 560, 570 of sockliner 100 may extend less than the full depth of the mold.

Suitable sockliner materials include natural latex rubber, ethylene vinyl alcohol (EVA), styrene-butadiene rubber (SBR), polyurethane, polyethylene, elastomeric foams, and combinations thereof. A frothed foam, such as a mechanically frothed foam, may be used. A mechanically frothed foam having a specific gravity of less than 0.4gm per cubic centimeter and a hardness of 20-40 Asker "C" in polyurethane or blends of natural and synthetic rubber have been found to provide a particularly good balance of compressibility and resistance to compression (e.g., cushioning or support) for athletic shoes, with or without a builder. Different materials could be used for different portions of sockliner 100. For example, mold 700 could be partially filled with a first material and then filled with second, third, fourth, and/or fifth materials, yielding different properties through the depth of sockliner 100. As another example, the portion of a mold 700 corresponding to wings 560, 570 may be filled with a first material as the body portion of the mold is filled with a second material. The body, the wings, or both, could additionally have layers of different materials at different depths. In some aspects, mold 700 is filled completely, or even over-filled and leveled off, to ensure a flat, planar top surface in the molded part. Alternately, or in addition, care may be taken to keep mold 700 oriented such that while the sockliner material is still flowable, mold 700 is oriented and stabilized to maintain the top of the sockliner material inside mold 700 at an acceptable angle.

Figure 8:
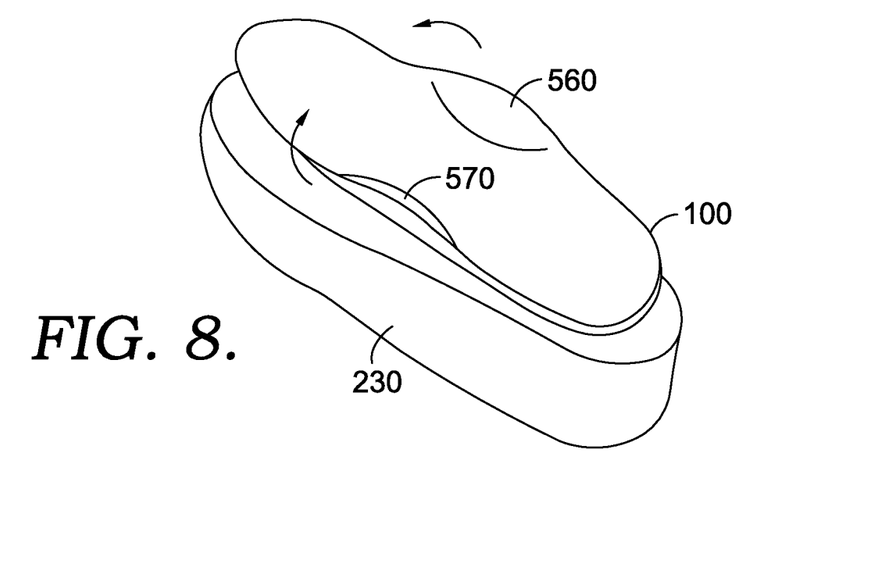
FIG. 8 is a perspective view of an exemplary sockliner as it is added to a shoe in accordance with aspects of this disclosure.

A shoe 200 may be formed on a last that includes an allowance for a sockliner. The allowance for the sockliner keeps open a space for inserting the sockliner between upper 220 and sole 230 after the upper 220 is joined to sole 230 and the joined shoe parts are removed from the last. The sockliner may be inserted into shoe 200 after upper 220 has been joined to sole 230. Only sole 230 is shown in FIG. 8 to provide a clear view of the fit between sockliner 100 and sole 230. As sockliner 100 is pressed into sole 230, wings 560, 570 are pressed upward and inward by sole 230 and upper 220. Bottom surface 161B of sockliner 100 will typically conform to sole 230, because sockliner 100 will be more compressible and/or conformable than sole 230. As bottom surface 161 of sockliner 100 is pressed against sole 230 and upper 220 (not shown), the upward and inward pressure on wings 560, 570 will modify the topography of top surface 165, forming a contoured foot bed. Even as the top surface 165 of sockliner 100 changes significantly, it may remain smooth, e.g., free of or substantially free of wrinkles.

The smoothness of the top surface 165 may contribute to a comfortable sockliner 100, with reduced pressure points on the foot, e.g., from wrinkles or abrupt changes in thickness or shape. The smoothness of the surface may also make the interior of the shoe more aesthetically pleasing. A wrinkled, puckered, or unfamiliar surface shape or texture may cause a consumer to question whether the shoe is of good quality, was well-assembled, will be durable, and/or will be comfortable, even if the wrinkles or surface features would not cause discomfort. In general, dependent upon the combination of the materials and contours of the sockliner as well as the shape of the shoe, top surface 165 of sockliner 100 may remain substantially free of wrinkles after being placed in a shoe if the material used can be compressed by at least 20% in any linear direction.

Some compression of the sockliner may help hold it in place if it is not otherwise secured into the shoe. While it may be useful to be able to remove the sockliner, it is also useful for the sockliner to fit securely in the shoe, so that the sockliner moves as little as possible relative to other components of the shoe and/or a wearer's foot. In some aspects, the sockliner may be cemented, glued, or otherwise adhered to the inside of the shoe. In some aspects, the sockliner may be sewn or otherwise joined to the inside of the shoe.

Figure 9A:
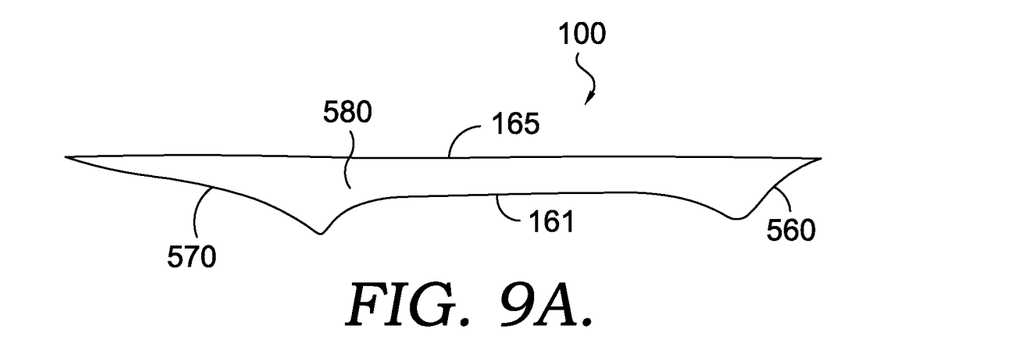
FIG. 9A is a cross-sectional view of a sockliner in accordance with aspects of this disclosure.
Figure 9B:
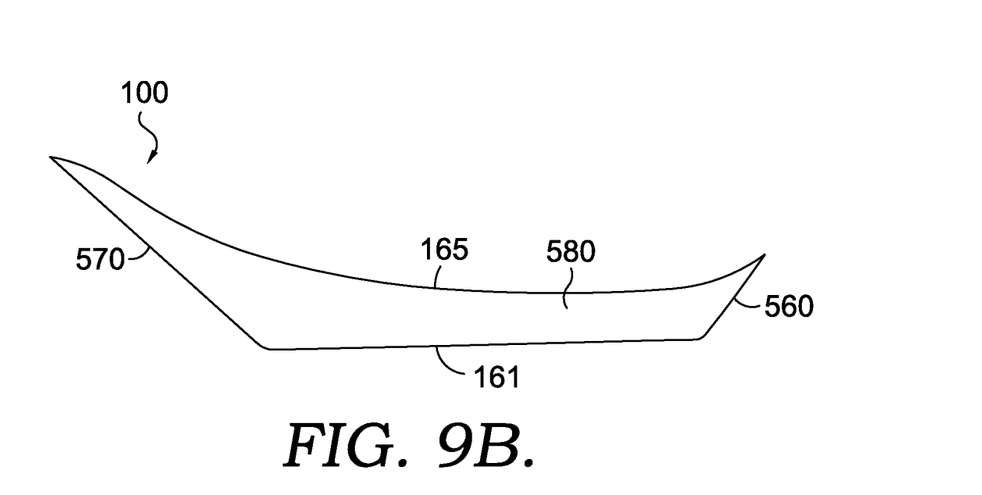
FIG. 9B is a cross-sectional view of a sockliner in accordance with aspects of this disclosure.

When wings 560, 570 are lifted and sockliner 100 is deformed from the relaxed conformation 130 to an in-use conformation 120, the bottom surface 161 may change configuration, too. Bottom surface 161 may have a linear or convex shape relative to top surface 165 in the relaxed conformation 130. Bottom surface 161B may have a linear or concave shape relative to top surface 165B when wing or wings 560, 570 are lifted and sockliner 100 is in an in-use conformation 120. If bottom surface 161 has a linear relaxed state, it may have a concave shape in the in-use state. If bottom surface 161 has a linear assembled state, it may have a convex shape in the relaxed state. This is shown in a side view in FIGS. 9A and 9B. FIG. 9A shows sockliner 100 in a relaxed conformation 130, and FIG. 9B shows sockliner 100 in an in-use conformation 120.

The dimensions of sockliner 100 may be determined by starting from the desired shape of sockliner 100 in the in-use conformation 120. For existing shoes using a conventional sockliner, the desired dimensions can be measured from an existing sockliner. For new shoes, the desired shape and dimensions can be calculated using, without limitation, one or more of the shape of the interior of the shoe, desired support points within the shoe, and desired cushion points within the shoe. Desired support and/or cushion points may depend upon the kind of shoe and its intended purpose. For example, soccer shoes may require different distributions of cushioning and/or support than running shoes.

Figure 10A:
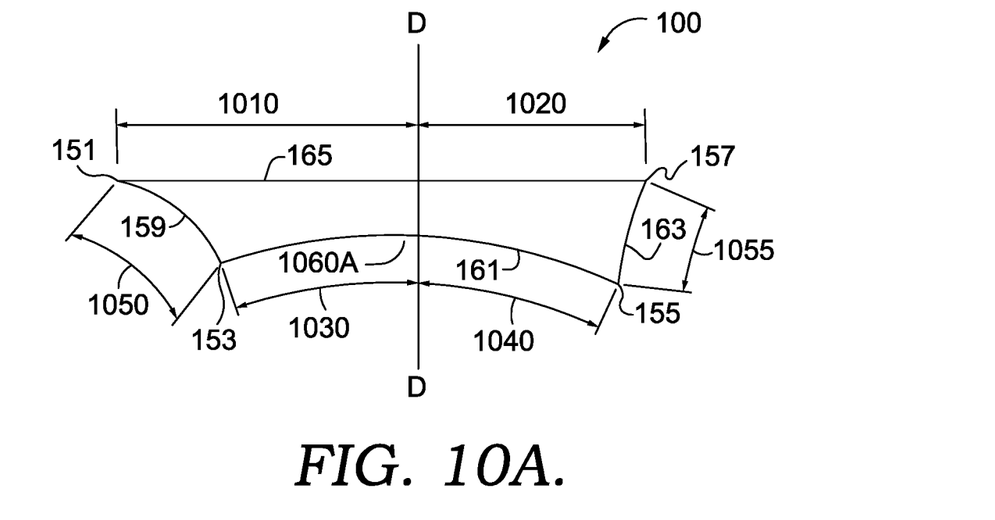
FIG. 10A is a cross-sectional view of an exemplary sockliner in accordance with aspects of this disclosure.
Figure 10B:
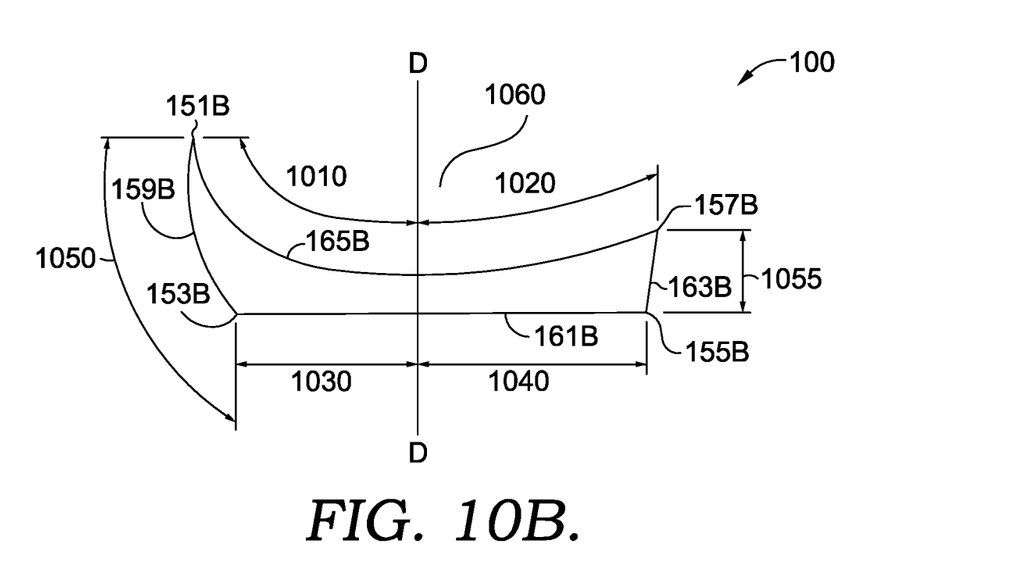
FIG. 10B is a cross-sectional view of an exemplary sockliner in accordance with aspects of this disclosure.

FIG. 10A shows an exemplary sockliner 100 in a relaxed conformation. Sockliner 100 has centerline D. The dimensions of sockliner 100 in the relaxed conformation can be measured or calculated from the sockliner in an in-use conformation, as shown in FIG. 10B. For example, an arc length 1010 from the upper medial edge 151B to centerline D may be measured or calculated if working from an intangible design rather than an actual sockliner or physical model. Similarly, arc length 1020 may be measured or calculated from centerline D to the upper lateral edge 157B. These arc lengths may be reapplied as linear lengths 1010 and 1020 for the flat top surface 165 of sockliner 100, as shown in a relaxed conformation in FIG. 10A. Likewise, lengths 1030 and 1040 may be measured or calculated between centerline D and the lower medial edge 153B and the lower lateral edge 155B, respectively, in the in-use conformation shown in FIG. 10B to determine the lengths 1030, 1040 from centerline D to lower medial edge 153 and lower lateral edge 155, respectively, in the relaxed conformation shown in FIG. 10A.

The thickness of sockliner 100 can be measured as arc length 1050 in the in-use conformation in FIG. 10B, and reapplied as linear length 1050 in the relaxed configuration in FIG. 10A. The radius of curvature of arc 1060, if present, in the in-use conformation in FIG. 10B can then be used as a starting point for the radius of curvature of arc 1060A in the relaxed configuration in FIG. 10A. The radius of curvature of arc 1060A may be adjusted to account for the use of different materials or different densities of a material, appreciating that the density of a material may be varied intentionally (e.g., to modify cushioning or support), or the density of a material may vary as a function of variations in the raw material, process conditions, normal process variation and tolerances, and the like.

This conversion of the desired sockliner configuration to a pattern for a sockliner 100 that can be manufactured using a flat-top, open cast mold, such as mold 700, may simplify the manufacture of the sockliner and/or a shoe. The mold tooling for cast foam molding may be less complicated and/or less expensive than mold tooling for other molding processes. For example, cast foam molding may require only a single mold form, as opposed to a clamshell or multi-part mold for other molding processes. Cast foam molding may generate less waste compared, for example, to other molding processes, or to cutting or forming sockliners from a larger sheet or block of material. Cast foam molding may also permit the use of different materials, which may provide opportunities to improve cost, flexibility, support, cushioning, or other aspects of the sockliner. Further, a flexible, flat-surfaced (in the relaxed conformation) sockliner as described herein facilitates incorporating the sockliner into the shoe prior to or while joining the upper to the sole, simplifying manufacturing and potentially reducing the number of components. For example, the sockliner can be joined into the seam or joint between the upper and sole, securing the sockliner in place within the shoe while eliminating the need for a glue or adhesive. As another example, the sockliner may be joined to the upper or the sole prior to joining the upper to the sole.

If it is desired to join sockliner 100 to seam 270, sockliner 100 may be placed between upper 220 and sole 230 and at least a portion of an edge of sockliner 100 may be incorporated into seam 270. For example, at least a portion of the perimeter edge of bottom surface 161 of sockliner 100 may be sewn into a strobel-type seam 270, joining sockliner 100 to both upper 220 and sole 230.

Figure 11A:
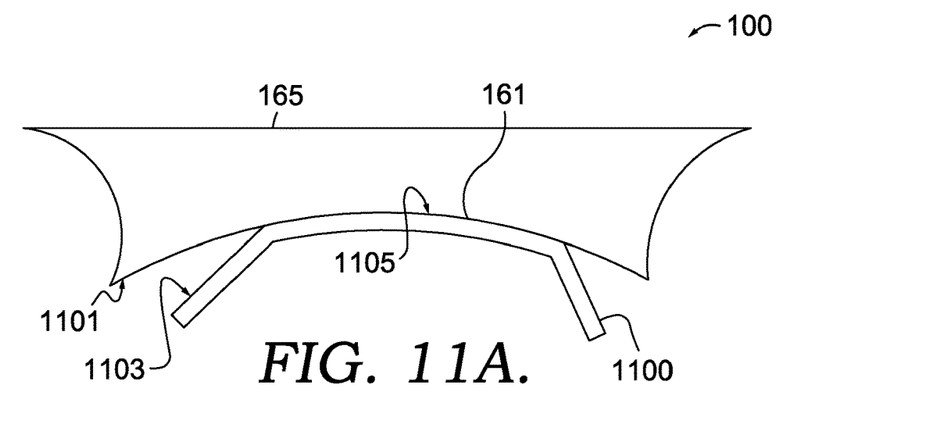
FIG. 11A is a cross-sectional view of an exemplary sockliner with an attached skirt in accordance with aspects of this disclosure.
Figure 11B:
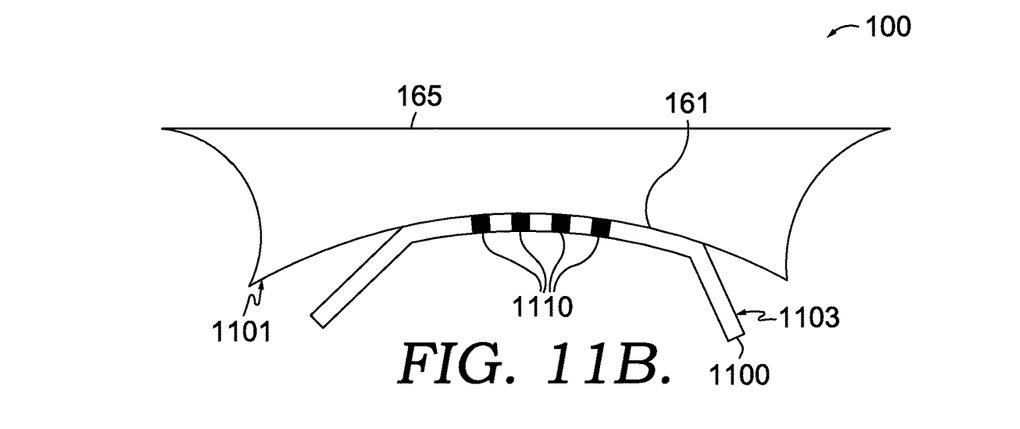
FIG. 11B is a cross-sectional view of an exemplary sockliner with an attached skirt in accordance with aspects of this disclosure.

In some aspects, a skirt 1100 may be attached to sockliner 100 to facilitate joining sockliner 100 in seam 270, as shown in FIGS. 11A and 11B. Skirt 1100 then provides a margin for gluing, welding, sewing, or otherwise joining skirt 1100 into seam 270 and/or to any component of upper 220 and/or sole 230. Skirt 1100 may be present along at least a portion of the perimeter of sockliner 100, or along the entire perimeter of sockliner 100, or along the entire bottom surface 161 of sockliner 100, or may be present in some parts of sockliner 100 and not in others. For example, skirt 1100 may be present discontinuously around the perimeter of most of sockliner 100, or may be present along the toe-portion of sockliner 100, or along the heel-portion of sockliner 100, or along the arch portion of sockliner 100, or some combination thereof, with gaps in between. If skirt 1100 is discontinuous, it may be present as one skirt which does not extend uniformly to the perimeter of sockliner 100 in all directions, or it may be present as two or more distinct skirts. If two or more distinct skirts are used, they may be of the same or different materials.

Skirt 1100 may include any material suitable for embedding in or attaching to sockliner 100 and joining to other shoe materials, as at seam 270. The nature of the other shoe materials and the nature of the seam or joint will influence the choice of the skirt material. In general, suitable skirt materials include, without limitation, fabrics, woven, knitted or nonwoven, of synthetic or natural fibers, or combinations thereof. Netting, webs, or films may be used as fabrics if they are of sufficient strength to secure the sockliner in seam 270 or to other components of shoe 200.

Body 580 of sockliner 100 may have a central portion and a periphery. The central portion may be adjacent to a longitudinal centerline of sockliner 100, or a lateral centerline of sockliner 100, or both. The periphery 1101 may be a margin or border along at least a portion of the perimeter 520 of body 580. The periphery may extend between about 1 mm and about 26 mm from the edge of body 580 along perimeter 520. Skirt 1100 may have a central portion 1105 and a periphery 1103. The central portion 1105 may be adjacent to a longitudinal centerline of skirt 1100, or a lateral centerline of skirt 1100, or both. The periphery 1103 may be a margin or border along at least a portion of the outer perimeter of skirt 1100. The periphery 1103 may extend between about 1 mm and about 26 mm from the outer perimeter of skirt 1100.

Body 580 of sockliner 100 may be joined to skirt 1100 along a central portion of bottom surface 161, leaving at least a portion of the periphery 1103 of skirt 1100 loose from at least a portion of the periphery 1101 of body 580 of sockliner 100. The periphery 1103 of skirt 1100 may be loose from all of the periphery 1101 of body 580 of sockliner 100, or may be loose from the periphery of body 580 in all portions of body 580 where skirt 1100 is present. Skirt 1100 may extend along substantially all (e.g., 80% or more) or all of the periphery 1101 of body 580.

Figure 12:
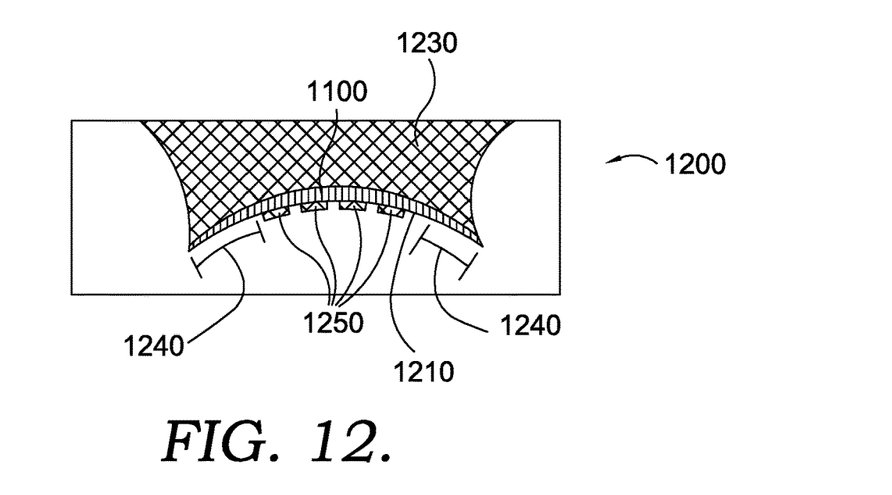
FIG. 12 is a cross-sectional view of an exemplary mold suitable for forming a sockliner in accordance with aspects of this disclosure.

FIG. 12 provides an example of how a skirt can be incorporated into sockliner 100 during the process of molding sockliner 100. Mold 1200 is shown in cross-section, so that the interior of the mold is visible. Mold 1200 has a mold form 1230, with a forming surface 1210 defining a cavity inside mold 1200 for receiving sockliner material. A skirt 1100 can be placed adjacent to or against the forming surface 1210 of mold form 1230, and sockliner material may be added on top of skirt 1100. Skirt 1100 and/or the sockliner material may be selected and/or treated such that sockliner material, in its moldable state, will at least partially wet or impregnate skirt 1100, such that when the sockliner material cures, skirt 1100 is integral to or at least securely attached to sockliner 100.

One or more portions of skirt 1100, shown as arcs 1240, may be treated with a release agent. (Arcs 1240 are arcuate because of the shape of the exemplary forming surface in mold 1200. The periphery of skirt 1100 may have other shapes, including straight lines or alternative contours.) A release agent may leave a margin of skirt 1100 free of sockliner 100, which may make it easier to join skirt 1100 in seam 270 or to other portions of shoe 200. Suitable release agents may prevent skirt 1100 from being wetted or impregnated by the sockliner material, or may facilitate peeling those margins of skirt 1100 away from sockliner 100. Periphery of skirt 1100 may diverge from or not lie flat against the periphery of body 580 of sockliner 100. Periphery of skirt 1100 may diverge from or not lie flat against the periphery of body 580 of sockliner 100 particularly, but not exclusively, when body 580 is an in-use conformation (e.g., when wings 560, 570 have been lifted away from bottom surface 161B of body 580).

Exemplary release agents include, but are not limited to waxes, silicones, oils, and combinations thereof. Release agents generally lower the surface energy and/or increase the contact angle of the treated portion of skirt 1100 relative to the untreated portion of skirt 1100. Alternately, or in addition, portions of skirt 1100, such as the central portion 1105 of skirt 1100, may be treated with a wetting agent or treatment to facilitate wetting of skirt 1100 by the sockliner material during molding. Wetting agents or treatments generally increase the surface energy and/or lower the contact angle of the treated portion of skirt 1100 relative to the untreated portion of skirt 1100.

Mold form 1230 may have a central portion and a periphery. The central portion may be adjacent to a longitudinal centerline of mold form 1230, or a lateral centerline of mold form 1230, or both. If desired, mold form 1230 may include one or more small pockets or indentations 1250 along the internal edges of the forming surface to facilitate sockliner material fully penetrating through skirt 1100, at least in portions 1110 of skirt 1100 corresponding to the indentations 1250. The indentations need not be large. A space on the order of 6-8 mm in depth may be sufficient for permitting fluid communication of a flowable foam from the main cavity into the indentation or indentations 1250, which may increase the amount of sockliner material penetrating through skirt 1100. The central portion of mold form 1230 may comprise one or more indentations 1250. In some aspects, there are no indentations 1250 in the periphery of mold form 1230. In some aspects, there are no indentations 1250 in a portion of mold form 1230 corresponding to one or more wings 560, 570 in sockliner 100. In some aspects, there are no indentations 1250 in the periphery or wing portion or portions of mold form 1230.

As used herein and in connection with the claims listed hereinafter, the terminology "any of claims" or similar variations of said terminology is intended to be interpreted such that features of claims may be combined in any combination. For example, an exemplary claim 4 may indicate the method/apparatus of any of claims 1 through 3, which is intended to be interpreted such that features of claim 1 and claim 4 may be combined, elements of claim 2 and claim 4 may be combined, elements of claim 3 and claim 4 may be combined, elements of claims 1, 2, and 4 may be combined, elements of claims 2, 3, and 4 may be combined, elements of claims 1, 2, 3, and 4 may be combined, and/or other variations. Further, the terminology "any of claims" or similar variations of said terminology is intended to include "any one of claims" or other variations of such terminology, as indicated by some of the examples provided above.

From the foregoing, it will be seen that various aspects of the sockliner are well adapted to attain all the ends and objects hereinabove set forth together with other advantages which will be understood from the disclosure by one of ordinary skill in the art.

It will be understood that certain features and subcombinations are of utility and may be employed without reference to other features and subcombinations. This is contemplated by and is within the scope of the claims.

Since many possible embodiments may be made without departing from the scope of the claims, it is to be understood that all matter herein set forth or shown in the accompanying drawings is to be interpreted as illustrative and not in a limiting sense.

What is claimed is:

1. A sockliner for a shoe, the sockliner having a toe end, a heel end, a medial side, and a lateral side, the sockliner comprising:
    a first configuration wherein the sockliner is relaxed, and a second configuration wherein the sockliner is flexed;
    a first, flat surface having a first perimeter in the first configuration;
    a second, contoured surface opposing the first, flat surface and having a second perimeter smaller than the first perimeter in the first configuration;
    a third surface joining an edge of the first, flat surface to a corresponding first edge of the second, contoured surface, wherein the third surface forms a concave contour relative to an interior of the sockliner between the first, flat surface and the second, contoured surface in the first configuration; and
    a fourth surface joining a second edge of the first, flat surface to a corresponding second edge of the second, contoured surface, wherein the fourth surface forms a concave contour relative to the interior of the sockliner between the first, flat surface and the second, contoured surface in the first configuration,
    wherein the sockliner is thinner in a border area along the first perimeter of the sockliner than at a center of the sockliner, and
    wherein when the third and fourth surfaces are lifted away from the second, contoured surface, the second configuration results in which the first, flat surface changes from the flat surface to a transversely-oriented arc that extends from the medial side to the lateral side.

2. The sockliner of claim 1, wherein the second, contoured surface comprises at least one arc.

3. The sockliner of claim 1, Wherein the transversely-oriented arc is concave relative to the first, flat surface.

4. The sockliner of claim 1, wherein the sockliner comprises natural latex rubber, ethylene vinyl alcohol (EVA), styrene-butadiene rubber (SBR), polyurethane, polyethylene, elastomeric foams, or combinations thereof.

5. The sockliner of claim 1, formed by molding a frothed foam.

6. A shoe comprising:
    an upper;
    a sole; and
    a sockliner having a toe end, a heel end, a medial side, and a lateral side, wherein the sockliner is configured to have a first configuration wherein the sockliner is relaxed, and a second configuration wherein the sockliner is flexed and disposed inside the upper; the sockliner comprising:
    a first surface, wherein the first surface is flat in the first configuration and comprises a transversely-oriented arc extending from the medial side to the lateral side in the second configuration;
    a second, contoured surface opposing the first surface;
    a third surface joining an edge of the first surface to a corresponding first edge of the second, contoured surface, wherein the third surface forms a concave contour relative to an interior of the sockliner between the first surface and the second, contoured surface in the first configuration; and
    a fourth surface joining a second edge of the first surface to a corresponding second edge of the second, contoured surface, wherein the fourth surface forms a concave contour relative to the interior of the sockliner between the first surface and the second, contoured surface in the first configuration;
    wherein the sockliner is thinner in a variable width border along a perimeter of the sockliner than at a center of the sockliner; and
    wherein the transversely-oriented arc in the first surface is formed when the third and fourth surfaces are lifted away from the second, contoured surface, when the sockliner is in the second configuration.

7. The shoe of claim 6, wherein there is a space between the second, third, and fourth surfaces of the sockliner and the sole.

8. The shoe of claim 7, wherein a strobel-type joint between the upper and the sole is placed in the space between the second, third, and fourth surfaces of the sockliner and the sole.

9. The shoe of claim 8, wherein the strobel-type joint is fully enclosed within the space between the second, third, and fourth surfaces of the sockliner and the sole.

10. The shoe of claim 8, wherein the strobel-type joint further joins the sockliner to the upper.

11. A sockliner comprising:
a first configuration wherein the sockliner is relaxed, and a second configuration wherein the sockliner is flexed;
a compressible foam body having a first, flat surface and a second, contoured surface opposite the first, flat surface in the first configuration;
and two or more wings integral to and extending laterally from the compressible foam body, the two or more wings differing in thickness, composition, or both from the compressible foam body, the two or more wings comprising a third surface and a fourth surface,
wherein the third surface joins an edge of the first, flat surface to a corresponding first edge of the second, contoured surface, wherein the third surface forms a concave contour relative to an interior of the sockliner between the first, flat surface and the second, contoured surface in the first configuration;
wherein the fourth surface joins a second edge of the first, flat surface to a corresponding second edge of the second, contoured surface, wherein the fourth surface forms a concave contour relative to the interior of the sockliner between the first, flat surface and the second, contoured surface in the first configuration;
wherein the compressible foam body is contoured such that in the second configuration, the two or more wings are lifted away from the compressible foam body and the compressible foam body forms a laterally-oriented arc.

12. The sockliner of claim 11, wherein the compressible foam body has a perimeter configured to correspond to a peripheral shape of a wearer's foot, and at least one of the two or more wings is positioned proximate a heel of the wearer's foot.

13. The sockliner of claim 11, wherein the compressible foam body has a perimeter configured to correspond to a peripheral shape of a wearer's foot, and at least one wing of the two or more wings is positioned proximate an arch of the wearer's foot.

14. The sockliner of claim 11, wherein the second, contoured surface has a linear or convex shape relative to the first, flat surface in the first configuration, and has a concave shape relative to the first, flat surface in the second configuration when the two or more wings are lifted away from the compressible foam body.

* * * * *

UNITED STATES PATENT AND TRADEMARK OFFICE
CERTIFICATE OF CORRECTION

PATENT NO. : 10,602,803 B2
APPLICATION NO. : 15/439623
DATED : March 31, 2020
INVENTOR(S) : Bruce J. Kilgore Page 1 of 1

It is certified that error appears in the above-identified patent and that said Letters Patent is hereby corrected as shown below:

In the Claims

Column 12 Line 13: In Claim 3, delete "Wherein" and insert -- wherein --, therefor.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*